(12) United States Patent
Jitsui

(10) Patent No.: US 12,372,819 B2
(45) Date of Patent: Jul. 29, 2025

(54) ELECTRONIC DEVICE

(71) Applicant: InnoLux Corporation, Miao-Li County (TW)

(72) Inventor: Kazuto Jitsui, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 18/226,791

(22) Filed: Jul. 27, 2023

(65) Prior Publication Data

US 2025/0035969 A1  Jan. 30, 2025

(51) Int. Cl.
*G02F 1/13* (2006.01)
*G02F 1/1343* (2006.01)

(52) U.S. Cl.
CPC ...... *G02F 1/1323* (2013.01); *G02F 1/134363* (2013.01)

(58) Field of Classification Search
CPC .. G02F 1/1323; G02F 1/1347; G02F 1/13471; G02F 1/134363
See application file for complete search history.

(56) References Cited

U.S. PATENT DOCUMENTS

| | | | |
|---|---|---|---|
| 9,983,422 B2 | 5/2018 | Chung et al. | |
| 10,073,307 B1* | 9/2018 | Chang | G02F 1/134309 |
| 2014/0191933 A1* | 7/2014 | Fan | G02F 1/133 345/89 |
| 2019/0353943 A1* | 11/2019 | Smith | G02F 1/133528 |
| 2021/0271138 A1* | 9/2021 | Tien | G02F 1/133345 |
| 2023/0236448 A1* | 7/2023 | Murata | G02F 1/133514 349/33 |
| 2023/0296932 A1* | 9/2023 | Murata | G02F 1/1323 349/56 |
| 2024/0004239 A1* | 1/2024 | Ikeda | G02F 1/134309 |

\* cited by examiner

*Primary Examiner* — Nathanael R Briggs
(74) *Attorney, Agent, or Firm* — Winston Hsu

(57) ABSTRACT

An electronic device includes a display panel and a viewing angle switchable panel overlapping with the display panel. The viewing angle switchable panel includes a first substrate, a second substrate, a first electrode, a second electrode, a third electrode and a switching medium layer. The second substrate is disposed opposite to the first substrate. The switching medium layer is disposed between the first substrate and the second substrate. The viewing angle switchable panel is capable of being controlled by the first electrode, the second electrode and the third electrode to be switched in a first mode or in a second mode, and the first mode and the second mode are modes with different viewing angles.

19 Claims, 11 Drawing Sheets

ELECTRONIC DEVICE

BACKGROUND OF THE DISCLOSURE

1. Field of the Disclosure

The present disclosure relates to an electronic device, and more particularly, to an electronic device capable of switching viewing angle.

2. Description of the Prior Art

With the advancement of technology, electronic devices equipped with displays have become indispensable in modern life. As users begin to attach greater importance to the privacy when viewing the electronic devices, the electronic devices with anti-peeping function emerge as the times require. The electronic devices with anti-peeping function can be switched between a privacy mode and a share mode.

However, the electronic devices with anti-peeping function have not yet met expectations in all aspects. For example, backlights with narrow light distribution are used in some non-self-luminous type electronic devices to improve the privacy mode, but the performance of the share mode is affected, and the power required by the backlights is increased. Therefore, there is still a need to improve the electronic devices with anti-peeping function.

SUMMARY OF THE DISCLOSURE

According to an embodiment of the present disclosure, an electronic device includes a display panel and a viewing angle switchable panel. The viewing angle switchable panel overlaps with the display panel. The viewing angle switchable panel includes a first substrate, a second substrate, a first electrode, a second electrode, a third electrode and a switching medium layer. The second substrate is disposed opposite to the first substrate. The first electrode is disposed on an inner surface of the first substrate. The second electrode is disposed on an inner surface of the second substrate. The third electrode is disposed on the inner surface of the second substrate and is electrically insulated from the second electrode. The switching medium layer is disposed between the first substrate and the second substrate. The viewing angle switchable panel is capable of being controlled by the first electrode, the second electrode and the third electrode to be switched in a first mode or in a second mode, and the first mode and the second mode are modes with different viewing angles.

These and other objectives of the present disclosure will no doubt become obvious to those of ordinary skill in the art after reading the following detailed description of the embodiment that is illustrated in the various FIG.s and drawings.

DETAILED DESCRIPTION

Figure 1:
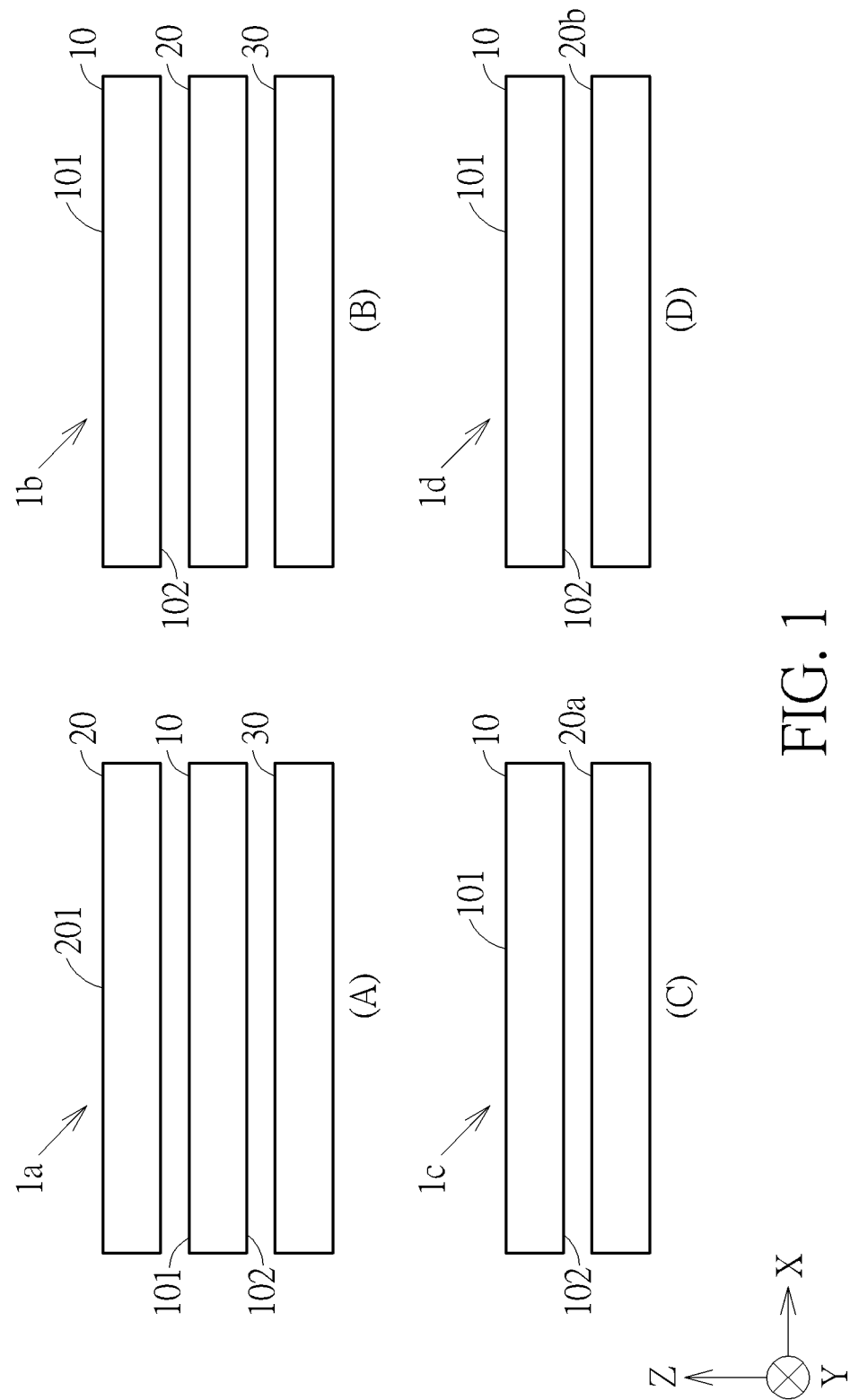
FIG. 1 is a schematic diagram showing side views of electronic devices according to some embodiments of the present disclosure.

The present disclosure may be understood by reference to the following detailed description, taken in conjunction with the drawings as described below. Wherever possible, the same or similar parts in the drawings and descriptions are represented by the same reference numeral.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include/comprise" and "have" are used in an open-ended fashion, and thus should be interpreted to mean "include, but not limited to . . . ".

In the present disclosure, the directional terms, such as "on/up/above", "down/below". "front", "rear/back", "left", "right", etc., are only directions referring to the drawings. Therefore, the directional terms are used for explaining and not used for limiting the present disclosure. Regarding the drawings, the drawings show the general characteristics of methods, structures, and/or materials used in specific embodiments. However, the drawings should not be construed as defining or limiting the scope or properties encompassed by these embodiments. For example, for clarity, the relative size, thickness, and position of each layer, each area, and/or each structure may be reduced or enlarged.

In the present disclosure, when a structure (or layer, or component, or substrate) is described as located on/above another structure (or layer, or component, or substrate), it may refer that the two structures are adjacent and directly connected with each other, or the two structures are adjacent and indirectly connected with each other. The two structures being indirectly connected with each other may refer that at least one intervening structure (or intervening layer, or intervening component, or intervening substrate, or intervening interval) exists between the two structures, a lower surface of one of the two structure is adjacent or directly connected with an upper surface of the intervening structure, and an upper surface of the other of the two structures is adjacent or directly connected with a lower surface of the intervening structure. The intervening structure may be a single-layer or multi-layer physical structure or a non-physical structure, and the present disclosure is not limited thereto. In the present disclosure, when a certain structure is disposed "on/above" other structures, it may refer that the certain structure is "directly" disposed on/above the other structures, or the certain structure is "indirectly" disposed on/above the other structures, i.e., at least one structure is disposed between the certain structure and the other structures.

The terms "about", "equal", "identical/the same", or "substantially/approximately" mentioned in this document generally mean being within 20% of a given value or range, or being within 10%, 5%, 3%, 2%, 1% or 0.5% of the given value or range.

Furthermore, any two values or directions used for comparison may have a certain error. If a first value is equal to a second value, it implies that there may be an error of about 10% between the first value and the second value; if a first direction is perpendicular or "substantially" perpendicular to a second direction, then an angle between the first direction and the second direction may be between 80 degrees to 100 degrees; if the first direction is parallel or "substantially" parallel to the second direction, an angle between the first direction and the second direction may be between 0 degree to 10 degrees.

Although ordinal numbers such as "first", "second", etc., may be used to describe elements in the description and the claims, it does not imply and represent that there have other previous ordinal number. The ordinal numbers do not represent the order of the elements or the manufacturing order of the elements. The ordinal numbers are only used for discriminate an element with a certain designation from another element with the same designation. The claims and the description may not use the same terms. Accordingly, a first element in the description may be a second element in the claims.

In addition, the term "a given range is from a first value to the second value" or "a given range falls within a range from a first value to a second value" refers that the given range includes the first value, the second value and other values therebetween.

Moreover, the electronic device of the present disclosure may include a display device, a backlight device, an antenna device, a sensing device, a tiled device, a touch display device, a curved display device or a free shape display device, but not limited thereto. The electronic device may exemplarily include liquid crystal, light emitting diode, fluorescence, phosphor, other suitable display media or a combination thereof, but not limited thereto. The display device may be a non-self-luminous type display device or a self-luminous type display device. The antenna device may be a liquid-crystal-type antenna device or a non-liquid-crystal-type antenna device. The sensing device may be a device for sensing capacitance, light, thermal or ultrasonic, but not limited thereto. The electronic components of the electronic device may include passive components and active components, such as capacitors, resistors, inductors, diodes, transistors, etc., but not limited thereto. The diode may include a light emitting diode (LED) or a photodiode. The light emitting diode may include organic light emitting diode (OLED), mini LED, micro LED or quantum dot LED, but not limited thereto. The tiled device may exemplarily be a tiled display device or a tiled antenna device, but not limited thereto. Furthermore, the electronic devices may be foldable or flexible electronic devices. The electronic device may be any combination of aforementioned devices, but not limited thereto. Furthermore, a shape of the electronic device may be a rectangle, a circle, a polygon, a shape with curved edge or other suitable shape. The electronic device may have peripheral systems, such as a driving system, a control system, a light system, etc., for supporting the display device, the antenna device, the wearable device (which exemplarily includes an augmented reality (AR) device or a virtual reality (VR) device), the vehicle-mounted device (which exemplarily includes a windshield of a vehicle) or the tiled device.

In the present disclosure, it should be understood that a depth, a thickness, a width or a height of each element, or a spaced distance or a distance between elements may be measured by an optical microscopy (OM), a scanning electron microscope (SEM), a film thickness profiler ($\alpha$-step), an ellipsometer or other suitable methods. In some embodiments, a cross-sectional image including elements to be measured can be obtained by the SEM, and the depth, the thickness, the width or the height of each element, or the spaced distance or the distance between elements can be measured thereby.

It should be noted that the technical features in different embodiments described in the following can be replaced, recombined, or mixed with one another to constitute another embodiment without departing from the spirit of the present disclosure.

Unless otherwise defined, all terms (including technical and scientific terms) used herein have the same meaning as commonly understood by a person having ordinary skill in the art to which the disclosure belongs. It can be understood that these terms, such as those defined in commonly used dictionaries, should be interpreted as having meanings consistent with the background or context of the related technology and the present disclosure, and should not be interpreted in an idealized or overly formal manner, unless otherwise specified in the disclosed embodiments.

In the present disclosure, the following drawings are described in conjunction with the XYZ Cartesian coordinate system for the sake of convenience. In the present disclosure, the terms such as "spaced distance" or "distance" between elements and "width" or "length" of the element are defined by the projection of the element on the XY plane, YZ plane or XZ plane along the direction X, the direction Y or the direction Z. Similarly, terms such as "parallel" or "non-parallel" used herein refers to the projections of the extending lines of the elements on the XY plane, the YZ plane, or the XZ plane are "parallel" or "non-parallel".

In the present disclosure, when one element "overlaps with" another element, it refers that at least a portion of the element overlaps with at least a portion of the another element along a direction.

Please refer to FIG. 1, which is a schematic diagram showing side views of electronic devices according to some embodiments of the present disclosure. The electronic device according to the present disclosure may be the electronic device 1$a$ shown in the part A of FIG. 1, the electronic device 1$b$ shown in the part B of FIG. 1, the electronic device 1$c$ shown in the part C of FIG. 1, and the electronic device 1$d$ shown in the part D of FIG. 1, but not limited thereto. The electronic device 1$a$, the electronic device 1$b$, the electronic device 1$c$ and the electronic device 1$d$ are exemplarily applied as display devices, and may also include other functions, such as touch and detection, but not limited thereto. The electronic device 1$a$, the electronic device 1$b$, the electronic device 1$e$ and the electronic device 1$d$ are exemplary flat electronic devices, but not limited thereto. In other embodiments of the present disclosure, the electronic device 1a, the electronic device 1b, the electronic device 1c and the electronic device 1d may be non-flat electronic devices such as curved electronic devices.

In the part A of FIG. 1, the electronic device 1a includes a display panel 20 and a viewing angle switchable panel 10, and may optionally include a backlight module 30, the viewing angle switchable panel 10 overlaps with the display panel 20, and the backlight module 30 overlaps with the viewing angle switchable panel 10 and/or the display panel 20. That is, the electronic device 1a is exemplary a non-self-luminous type electronic device. For example, the display panel 20 may include a liquid crystal panel, but not limited thereto. The viewing angle switchable panel 10 may be disposed below the display panel 20 and located between the display panel 20 and the backlight module 30, but not limited thereto. With the viewing angle switchable panel 10, the electronic device 1a can be switched between a narrow viewing angle mode and a wide viewing angle mode. For details of the viewing angle switchable panel 10, reference may be made to the following description. The backlight module 30 may include light emitting diodes (LEDs), mini LEDs, micro LEDs, quantum dots (QDs), QLEDs (QD-LED), fluorescence, phosphor, other suitable materials, or a combination thereof, but not limited thereto. In some embodiments, the backlight module 30 can be collimated backlight module with a narrow light distribution. In some embodiments, the backlight module 30 can be non-collimated backlight module.

In the part B of FIG. 1, the main difference between the electronic device 1b and the electronic device 1a is the position of the viewing angle switchable panel 10. The viewing angle switchable panel 10 may be disposed above the display panel 20. For other details of the electronic device 1b, reference may be made to the relevant description of the electronic device 1a. Compared with a conventional electronic device equipped with a backlight module having a narrow light distribution for improving the privacy mode, the backlight module 30 of the electronic device 1a and the electronic device 1b according to the present disclosure can be a general backlight module.

In the part C of FIG. 1, the electronic device 1c may include a viewing angle switchable panel 10 and a display panel 20a, and the backlight module 30 is not required. Herein, the electronic device 1c is exemplary a reflective type electronic device. For example, the display panel 20a may be E-Paper, but not limited thereto. The viewing angle switchable panel 10 may be disposed above the display panel 20a.

In the part D of FIG. 1, the electronic device 1d may include a viewing angle switchable panel 10 and a display panel 20b, and the backlight module 30 is not required. Herein, the electronic device 1d is exemplary as a self-luminous type electronic device. For example, the display panel 20b may be an OLED panel or mini LED panel or micro LED panel, but not limited thereto. The viewing angle switchable panel 10 may be disposed above the display panel 20b.

In the electronic device 1a, the display panel 20 is disposed uppermost, and the upper surface 201 of the display panel 20 may be used as the light-emitting surface of the electronic device 1a, i.e., the viewing surface for a viewer (not shown). When the electronic device 1a is applied as a display device, the surface 201 may be regarded as a display surface of the electronic device 1a. In the electronic device 1b, the electronic device 1c and the electronic device 1d, the viewing angle switchable panel 10 is disposed uppermost, and the upper surface 101 of the viewing angle switchable panel 10 may be used as the light-emitting surface of the electronic device 1b, the electronic device 1c and the electronic device 1d, i.e., the viewing surface for the viewer (not shown). When the electronic device 1b, the electronic device 1c the and electronic device 1d are applied as display devices, the surface 101 may be regarded as the display surface of the electronic device 1b, the electronic device 1c and the electronic device 1d.

In FIG. 1, although there is a gap between any two elements of the display panel 20/display panel 20a/display panel 20b, the viewing angle switchable panel 10 and the backlight module 30 which are adjacent to each other, the two elements which are adjacent to each other may be disposed close to each other, or only have a small spaced distance therebetween.

According to the above description, the electronic device according to the present disclosure may be optionally disposed with the backlight module according to the types of the display panel. In addition, the viewing angle switchable panel may be cooperated with different types of display panel, which has the advantage of wide versatility.

In the present disclosure, the narrow viewing angle mode, also called a privacy mode, refers that a viewer directly in front of the electronic device (for example, a viewing angle of 0 degree) can see a clearer image (for example, an image with brighter brightness), and a viewer obliquely in front of the electronic device (for example, a viewing angle greater than 45 degrees) sees a less clear image (for example, an image with a darker brightness, or an image shielded by a shielding pattern). The wide viewing angle mode, also called a share mode, refers that both the viewer directly in front of the electronic device and the viewer obliquely in front of the electronic device can see a clearer image.

According to the electronic device of the present disclosure, the brightness of the viewing angle of 0 degree may be defined as a first brightness, and the brightness of the viewing angles out of −45 degrees and 45 degrees (i.e., the viewing angle greater than 45 degrees and the angle less than −45 degrees, such as −50 degrees, −60 degrees, 50 degrees, or 60 degree), may be defined as a second brightness. For example, when the electronic device is in the narrow viewing angle mode, the ratio of the second brightness to the first brightness may be in a range from 0% to 10%, but not limited thereto. When the electronic device is in the wide viewing angle mode, the ratio of the second brightness to the first brightness may be greater than 10% and less than or equal to 100%, but not limited thereto.

Figure 2:
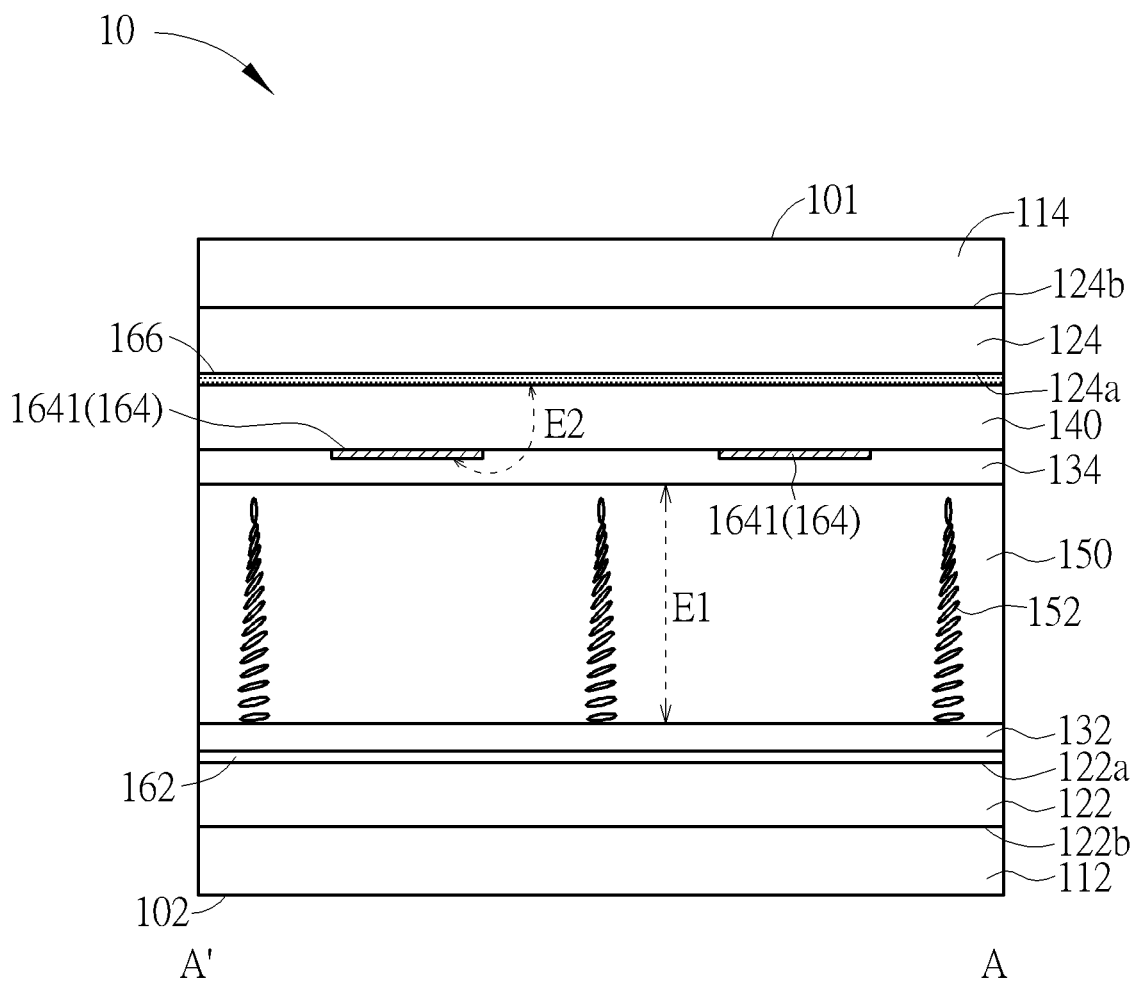
FIG. 2 is a schematic diagram showing a partial cross-sectional view of a viewing angle switchable panel according to one embodiment of the present disclosure.
Figure 3:
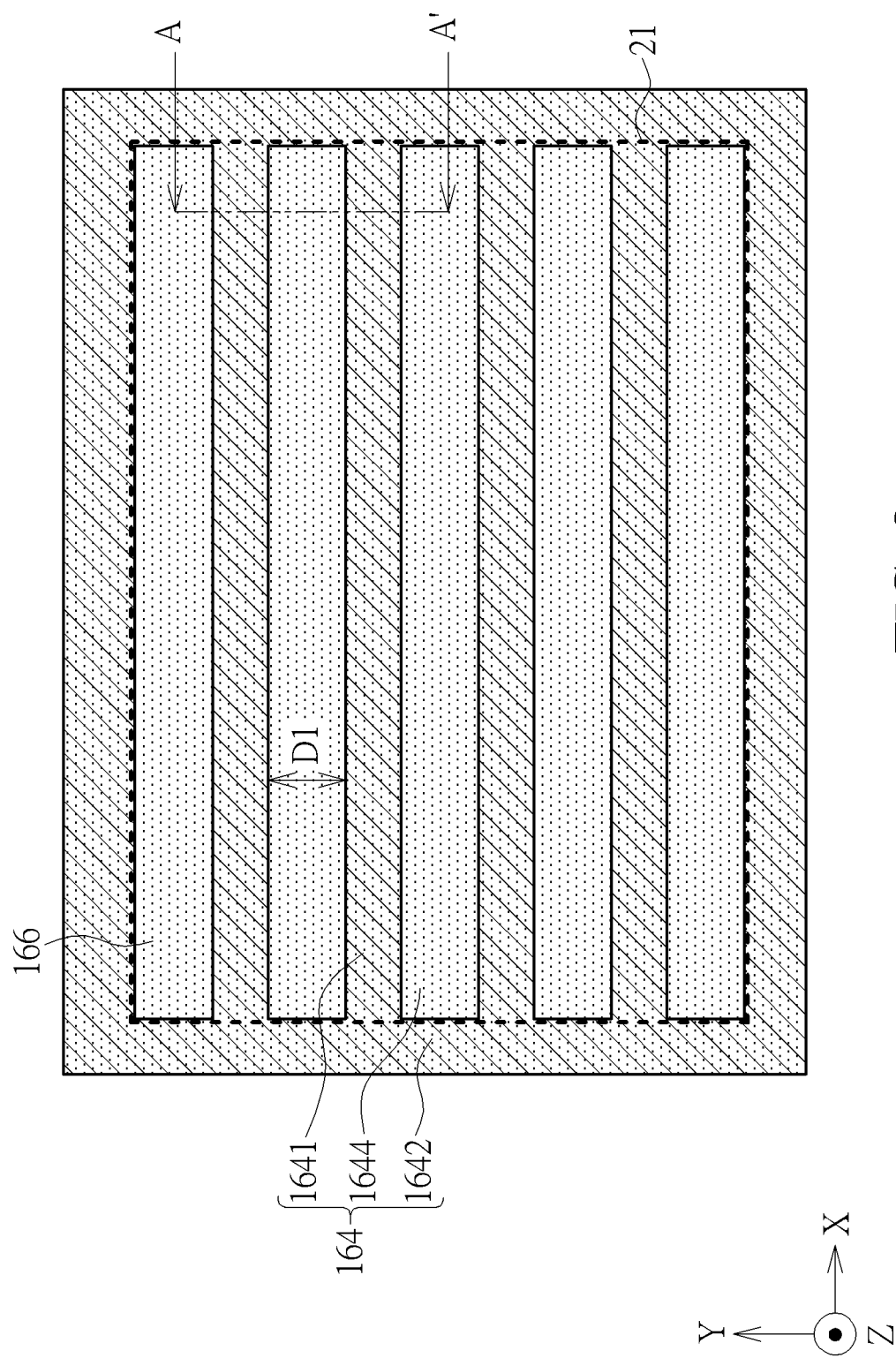
FIG. 3 is a schematic diagram showing top views of a second electrode and a third electrode according to one embodiment of the present disclosure.

Please refer to FIG. 2 and FIG. 3. FIG. 2 is a schematic diagram showing a partial cross-sectional view of a viewing angle switchable panel according to one embodiment of the present disclosure. FIG. 3 is a schematic diagram showing top views of a second electrode and a third electrode according to one embodiment of the present disclosure. The partial cross-sectional view in FIG. 2 corresponds to the section line A-A' in FIG. 3. The viewing angle switchable panel 10 includes a first substrate 122, a second substrate 124, a first electrode 162, a second electrode 164, a third electrode 166 and a switching medium layer 150. The second substrate 124 is disposed opposite to the first substrate 122. The first electrode 162 is disposed on the inner surface 122a of the first substrate 122. The second electrode 164 is disposed on the inner surface 124a of the second substrate 124. The third electrode 166 is disposed on the inner surface 124a of the second substrate 124, and is electrically insulated from the second electrode 164.

According to some embodiments, the viewing angle switchable panel 10 is capable of being controlled by the first electrode 162, the second electrode 164 and the third electrode 166 to be switched in a first mode or in a second mode. The first mode and the second mode are modes with different viewing angles. For example, the first mode is a narrow viewing angle mode, and the second mode is a wide viewing angle mode.

Referring to FIG. 2, the switching medium layer 150 is disposed between the first substrate 122 and the second substrate 124. In some embodiments, a sealant layer (not shown) is disposed between the first substrate 122 and the second substrate 124 in a peripheral region. Thus, the switching medium layer 150 is sealed between the first substrate 122 and the second substrate 124 by the sealant layer. The peripheral region can be the region corresponding to the peripheral region of the display panel 20. For example, the peripheral region can be the region that the electronic device does not display images, but not limited thereto.

The switching medium layer 150 is capable of being controlled by the first electrode 162, the second electrode 164 and the third electrode 166 to be switched between a first state and a second state. When the switching medium layer 150 is in the first state, the viewing angle switchable panel 10 is in a narrow viewing angle mode, and when the switching medium layer 150 is in the second state, the viewing angle switchable panel 10 is in a wide viewing angle mode.

A retardation (Δnd) of the viewing angle switchable panel 10 can be 100 nanometers (nm) to 25000 nm, for example, 250 nm to 25000 nm, 1000 nm to 25000 nm, 2500 nm to 12500 nm or 5000 nm to 10000 nm. According to some embodiments, the retardation of the viewing angle switchable panel 10 can be 1000 nm to 5000 nm. The viewing angle switchable panel 10 may also include a sealant layer (not shown) disposed between the first substrate 122 and the second substrate 124. The sealant layer may be used to bond the first substrate 122 and the second substrate 124, so as to encapsulate the switching medium layer 150 between the first substrate 122 and the second substrate 124.

In FIG. 3, the insulating layer 140 disposed between the second electrode 164 and the third electrode 166 is omitted. As shown in FIG. 3, the second electrode 164 may include a plurality of slits 1644, and the second electrode 164 may include a plurality of first strip portions 1641. The first strips portions 1641 may extend along a first direction (herein, the direction X). In some embodiments, the first direction can be a longitudinal direction of the viewing angle switchable panel 10. One of the first strip portions 1641 is located between two of the slits 1644. A spaced distance D1 is between two of the first strip portions 1641, and the spaced distance D1 is the width of the slit 1644 along a second direction (herein, the direction Y). The second direction can be different from the first direction, for example, perpendicular to the first direction.

The position of the first strip portions 1641 substantially corresponds to the active area 21 of the display panel (such as the display panel 20, the display panel 20a or the display panel 20b in FIG. 1). For example, the active area 21 may be the display area where the electronic device displays images, but not limited thereto. The second electrode 164 may further include a first peripheral portion 1642. The first peripheral portion 1642 surrounds the plurality of slits 1644 and the plurality of first strip portions 1641, and the first peripheral portion 1642 may be disposed outside the active area 21 of the display panel (such as the display panel 20, the display panel 20a or display panel 20b in FIG. 1), such as the peripheral region where the electronic device does not display images, but not limited thereto. Herein, the shape of the first peripheral portion 1642 is exemplarily illustrated as a rectangular frame, and the first peripheral portion 1642 is connected with two ends of each of the first strip portions 1641, but not limited thereto.

Referring to FIG. 3, in a top view, the third electrode 166 is in plate shape and overlaps with the second electrode 164. In addition, in some embodiments, the edge (not labeled) of the second electrode 164 is substantially aligned with the edge of the third electrode 166, but not limited thereto. The arrangement of the second electrode 164 and the third electrode 166 in FIG. 3 is beneficial to provide a fringe field switching (FFS) mode. The viewing angle switchable panel 10 may further include an insulating layer 140 (see FIG. 2) disposed between the second electrode 164 and the third electrode 166, so that the second electrode 164 is electrically insulated from the third electrode 166. In the embodiment, the shapes of the second electrode 164 and the third electrode 166 are only exemplary, and the shapes of the second electrode 164 and the third electrode 166 can be adjusted according to actual requirements, which may refer to the relevant descriptions of FIG. 6, FIG. 7 and FIG. 8.

Please refer back to FIG. 2, the switching medium layer 150 may include, for example, a liquid crystal layer, other suitable display medium layers or a combination thereof, but not limited thereto. The liquid crystal layer may include a plurality of liquid crystal molecules 152, but not limited thereto. In FIG. 2, the liquid crystal molecules 152 are arranged in three straight lines, and there is a gap between two adjacent straight lines, which is exemplary. In practical, the number of the liquid crystal molecules 152 in the direction Y is not limited to three, and the liquid crystal molecules 152 may be randomly arranged and not limited to be arranged in regular straight lines.

Referring to FIG. 2, the viewing angle switchable panel 10 may include a first alignment layer 132 on the inner surface 122a of the first substrate 122, and a second alignment layer 134 on the inner surface 124a of the second substrate 124. The first alignment layer 132 can be disposed between the switching medium layer 150 and the first electrode 162, and the second alignment layer 134 can be disposed between the switching medium layer 150 and the second electrode 164. In some embodiments, the first alignment layer 132 and the second alignment layer 134 can have the same alignment properties, or can have different alignment properties. For example, the first alignment layer 132 can be a horizontal alignment layer, and the second alignment layer 134 can be a vertical alignment layer. For example, the first alignment layer 132 can be a vertical alignment layer, and the second alignment layer 134 can be a horizontal alignment layer. For example, the first alignment layer 132 and the second alignment layer 134 can be a horizontal alignment layer. For example, the first alignment layer 132 and the second alignment layer 134 can be a vertical alignment layer.

Herein, the first electrode 162 is disposed between the first alignment layer 132 and the first substrate 122. That is, the first alignment layer 132 is indirectly disposed on the inner surface 122a of the first substrate 122. The second electrode 164, the third electrode 166 and the insulating layer 140 are disposed between the second alignment layer 134 and the second substrate 124. That is, the second alignment layer 134 is indirectly disposed on the inner surface 124a of the second substrate 124.

Referring to FIG. 2, the viewing angle switchable panel 10 may further include a first polarizer 112 and a second polarizer 114. The first polarizer 112 may be disposed on the outer surface 122b of the first substrate 122, and the second polarizer 114 may be disposed on the outer surface 124b of the second substrate 124. The polarization axis (not shown) of the first polarizer 112 may be 0 degree (for example, parallel to the direction X) or 90 degrees (for example, parallel to the direction Y), and the polarization axes of the first polarizer 112 and the second polarizer 114 may be parallel to each other.

In the present disclosure, with the arrangement of the first electrode 162, the second electrode 164 and the third electrode 166, a vertical electric field E1 and a horizontal electric field E2 may be provided. For example, when the vertical electric field E1 is provided between the first electrode 162 and the second electrode 164, the viewing angle switchable panel 10 is in the narrow viewing angle mode, and the switching medium layer 150 is in the first state; when the horizontal electric field E2 is provided between the second electrode 164 and the third electrode 166, the viewing angle switchable panel 10 is in the wide viewing angle mode, and the switching medium layer 150 is in the second state. The first state and the second state of the switching medium layer 150 will be explained with FIG. 4.

Figure 4:
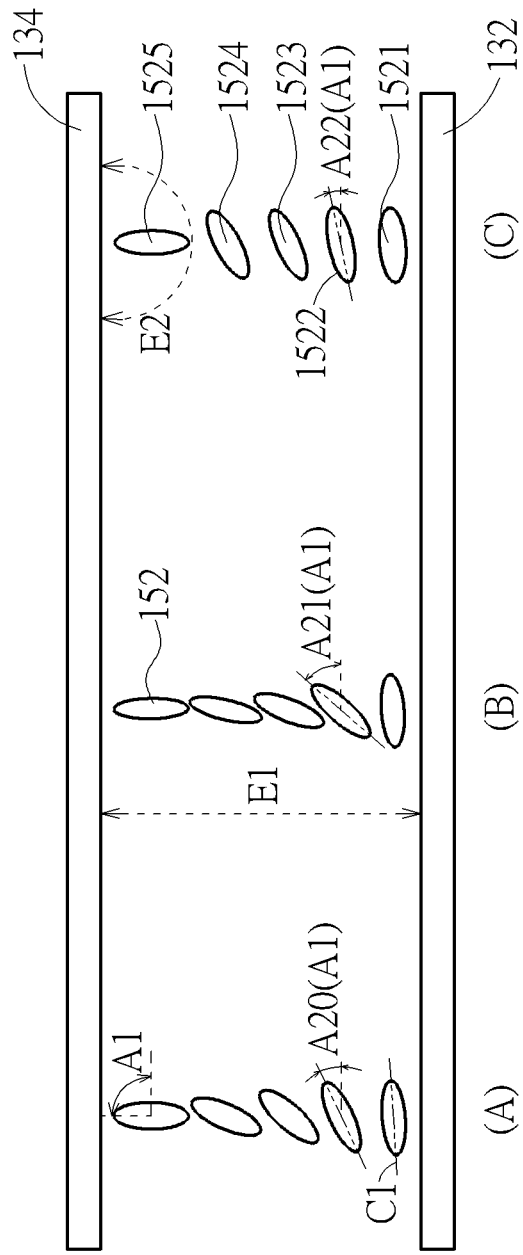
FIG. 4 is a schematic diagram showing states of a switching medium layer according to one embodiment of the present disclosure.

Please refer to FIG. 3 and FIG. 4 at the same time. FIG. 4 is a schematic diagram showing states of a switching medium layer according to one embodiment of the present disclosure. In FIG. 4, for the sake of convenience, the plurality of liquid crystal molecules 152 are sequentially named as the first liquid crystal molecule 1521, the second liquid crystal molecule 1522, the third liquid crystal molecule 1523, the fourth liquid crystal molecule 1524 and the fifth liquid crystal molecule 1525 from the first alignment layer 132 to the vertical second alignment layer 134. However, the number of liquid crystal molecules 152 is only exemplary and is not limited thereto. When the first electrode 162, the second electrode 164 and the third electrode 166 do not provide an electric field, as shown in part A, the switching medium layer 150 is in the initial state, wherein the first liquid crystal molecule 1521 is affected by the first alignment layer 132, and a long axis direction C1 of the first liquid crystal molecule 1521 is substantially parallel to the horizontal direction (such as the direction Y). That is, the angle A1 between the long axis direction C1 of the first liquid crystal molecule 1521 and the horizontal direction is about 0 degree. The fifth liquid crystal molecule 1525 is affected by the second alignment layer 134, and the long axis direction C1 of the fifth liquid crystal molecule 1525 is substantially perpendicular to the horizontal direction. That is, the angle A1 between the long axis direction C1 of the fifth liquid crystal molecule 1525 and the horizontal direction is about 90 degrees. In other words, the long axis direction C1 of the fifth liquid crystal molecule 1525 is substantially parallel to a vertical second direction (such as the direction Z). From the first alignment layer 132 to the second alignment layer 134, the orientations of the first liquid crystal molecule 1521 to the fifth liquid crystal molecule 1525 change gradually. For example, the angles A1 between the long axis direction C1 and the horizontal direction of the first liquid crystal molecule 1521 to the fifth liquid crystal molecule 1525 increase gradually, i.e., increase gradually from about 0 degree to about 90 degrees. When the first electrode 162, the second electrode 164 and third electrode 166 provide the vertical electric field E1, as shown in the part B, the switching medium layer 150 is in the first state. Compared with the initial state, the angles A1 between the long axis direction C1 and the horizontal direction of the second liquid crystal molecule 1522, the third liquid crystal molecule 1523 and the fourth liquid crystal molecule 1524 are increased. Taking the second liquid crystal molecule 1522 as an example, the angle A21 is greater than the angle A20, the first liquid crystal molecule 1521 is affected by the first alignment layer 132 to maintain the angle A1 of about 0 degree, and the fifth liquid crystal molecule 1525 is affected by the second alignment layer 134 to maintain the angle A1 of about 90 degrees. When the first electrode 162, the second electrode 164 and the third electrode 166 provide the horizontal electric field E2, as shown in the part C, the switching medium layer 150 is in the second state. Compared with the initial state, the angles A1 between the long axis direction C1 and the horizontal direction of the second liquid crystal molecule 1522, the third liquid crystal molecule 1523 and the fourth liquid crystal molecule 1524 are decreased. Taking the second liquid crystal molecule 1522 as an example, the angle A22 is smaller than the angle A20, the first liquid crystal molecule 1521 is affected by the first alignment layer 132 to maintain the angle A1 of about 0 degree, and the fifth liquid crystal molecule 1525 is affected by the second alignment layer 134 to maintain the angle A1 of about 90 degrees. In other words, by controlling the electric field provided by the first electrode 162, the second electrode 164 and the third electrode 166, the orientations of the liquid crystal molecules 152 other than the first liquid crystal molecule 1521 and the fifth liquid crystal molecule 1525 can be changed, so that the angle of the light (not shown) emitted from the viewing angle switchable panel 10 can be controlled, and the viewing angle of the electronic device can be controlled accordingly. For example, please refer back to the part A of FIG. 1. The light (not shown) provided by the backlight module 30 may enter the viewing angle switchable panel 10 from the lower surface 102 of the viewing angle switchable panel 10, and then may pass through the viewing angle switchable panel 10 and emit from the upper surface 101 of the viewing angle switchable panel 10. By controlling the electric field provided by the first electrode 162, the second electrode 164 and the third electrode 166, the angle of the light emitted from the upper surface 101 of the viewing angle switchable panel 10 can be controlled, and the viewing angle of the electronic device 1a can be controlled accordingly, so that the electronic device 1a can be switched between the narrow viewing angle mode and the wide viewing angle mode.

When an electric potential difference between the first electrode 162 and the second electrode 164 or an electric potential difference between the first electrode 162 and the third electrode 166 is greater than an electric potential difference between the second electrode 164 and the third electrode 166, the first electrode 162, the second electrode 164 and the third electrode de 166 can provide the vertical electric field E1. When the electric potential difference between the first electrode 162 and the second electrode 164 and the electric potential difference between the first electrode 162 and the third electrode 166 are smaller than the electric potential difference between the second electrode 164 and the third electrode 166, the first electrode 162, the second electrode 164 and the third electrode 166 can provide the horizontal electric field E2. For example, as shown in Table 1, when the electric potential V1 of the first electrode 162, the electric potential V2 of the second electrode 164 and the electric potential V3 of the third electrode 166 satisfy Formula (1) or Formula (2), the vertical electric field E1 can be provided. When the electric potential V1 of the first electrode 162, the electric potential V2 of the second electrode 164 and the electric potential V3 of the third electrode 166 satisfy Formula (3) or Formula (4), the horizontal electric field E2 can be provided. The direction of the vertical electric field E1 of Formula (1) is contrary to that of the vertical electric field E1 of Formula (2), and the direction of the horizontal electric field E2 of Formula (3) is contrary to that of the horizontal electric field E2 of Formula (4).

TABLE 1

| Formula (1) | V2 ≅ V3 > V1 |
| Formula (2) | V2 ≅ V3 < V1 |
| Formula (3) | V2 > V1 > V3 |
| Formula (4) | V2 < V1 < V3 |

V1 is the electric potential of the first electrode 162, V2 is the electric potential of the second electrode 164, and V3 is the electric potential of the third electrode 166.

In Formula (1) and Formula (2), the electric potential of the second electrode 164 and the electric potential of the third electrode 166 are the same or similar. When the electric potential of the second electrode 164 and the electric potential of the third electrode 166 are similar, a weak horizontal electric field E2 may also be generated between the second electrode 164 and the third electrode 166. Based on the relationship of the electric potentials of the first electrode 162, the second electrode 164 and the third electrode 166, the horizontal electric field E2 is weaker than the vertical electric field E1. That is, the vertical electric field E1 is dominant, i.e., the vertical electric field E1 can be regarded as the effective electric field. In other words, the aforementioned "the first electrode 162, the second electrode 164 and third electrode 166 provide the vertical electric field E1" covers the situation that only the vertical electric field E1 exists, and the situation that both the vertical electric field E1 and the horizontal electric field E2 exist but the vertical electric field E1 is stronger than the horizontal electric field E2. Similarly, the aforementioned "the first electrode 162, the second electrode 164, and the third electrode 166 provide the horizontal electric field E2" covers the situation that only the horizontal electric field E2 exists, and the situation that both the vertical electric field E1 and the horizontal electric field E2 exist but the horizontal electric field E2 is stronger than the vertical electric field E1.

More specifically, for example, when the electric potential of the first electrode 162 is 0 volt, the electric potential of the second electrode 164 is 3 volts, and the electric potential of the third electrode 166 is 3 volts, the electric potential difference between the first electrode 162 and the second electrode 164 (3 volts), and the electric potential difference between the first electrode 162 and the third electrode 166 (3 volts) are greater than the electric potential difference (0 volt) between the second electrode 164 and the third electrode 166, so that the vertical electric field E1 is provided. As another example, when the electric potential of the first electrode 162 is 0 volt, the electric potential of the second electrode 164 is +5 volts, and the electric potential of the third electrode 166 is −5 volts, the electric potential difference between the first electrode 162 and the second electrode 164 (5 volts) and the electric potential difference between the first electrode 162 and the third electrode 166 (−5 volts) are smaller than the electric potential difference between the second electrode 164 and the third electrode 166 (10 volts), so that the horizontal electric field E2 is provided.

In addition, the direction of the vertical electric field E1 or the horizontal electric field E2 can be changed periodically, which is beneficial to prevent image sticking. With reference to the aforementioned example of the vertical electric field E1, the electric potential of the first electrode 162 can be maintained at 0 volts, the electric potential of the second electrode 164 can be maintained at 3 volts, and the electric potential of the third electrode 166 can be maintained at 3 volts by an alternating current (AC) power source for a predetermined time, such as 16.7 milliseconds (ms), and the electric potential of the first electrode 162 can be maintained at 0 volts, the electric potential of the second electrode 164 can be maintained at −3 volts, and the electric potential of the third electrode 166 can be maintained at −3 volts by the alternating current power source for the predetermined time, so that the direction of the vertical electric field E1 are reversed every 16.7 milliseconds. The aforementioned electric potentials of the first electrode 162, the second electrode 164 and the third electrode 166 are exemplary, and can be flexibly adjusted according to actual requirements such as the types of the liquid crystal molecule 152, and the present disclosure is not limited thereto.

The first polarizer 112 and the second polarizer 114 may exemplary be composite films. For example, the first polarizer 112 and the second polarizer 114 may include a polyvinyl alcohol (PVA) film, a triacetate cellulose (TAC) film, and a pressure-sensitive adhesive (PSA film), but not limited to. The first substrate 122 and the second substrate 124 may exemplary be flexible or inflexible substrates. The first substrate 122 and the second substrate 124 may be transparent substrates, and the materials thereof may exemplarily include glass, quartz, sapphire, polyimide (PI), polycarbonate (PC), polyethylene terephthalate (PET), other suitable materials or a combination thereof, but not limited thereto. The materials of the first alignment layer 132 and the second alignment layer 134 may exemplarily include polyimide (PI), other suitable materials or a combination thereof, but not limited thereto. The materials of the first electrode 162, the second electrode 164 and the third electrode 166 may exemplarily include transparent conductive materials. The transparent conductive materials may exemplarily include indium tin oxides (ITOs), indium zinc oxides (IZOs), indium tin zinc oxides (IZTOs), other suitable materials or a combination thereof, but not limited thereto. The materials of the insulating layer 140 may exemplarily include transparent organic materials or inorganic material, such as photoresist materials, polyimide resins, epoxy resins, acrylic resins, $SiO_2$, $SiN_x$, other suitable materials, or a combination thereof, but not limited thereto.

Moreover, the viewing angle switchable panel 10 can be used in an upright position or an upside down position. For example, please refer back to the part A of FIG. 1, the surface 101 of the viewing angle switchable panel 10 faces toward the display panel 20, while the surface 102 of the viewing angle switchable panel 10 faces away from the display panel 20 (or faces toward the backlight module 30), but the present disclosure is not limited thereto. In other embodiment, the viewing angle switchable panel 10 can be placed upside down. That is, the surface 102 of the viewing angle switchable panel 10 faces toward the display panel 20, while the surface 101 of the viewing angle switchable panel 10 faces away from the display panel 20 (or faces toward the backlight module 30), which also allow the electronic device 1a to be switched between a narrow viewing angle mode and a wide viewing angle mode.

Figure 5:
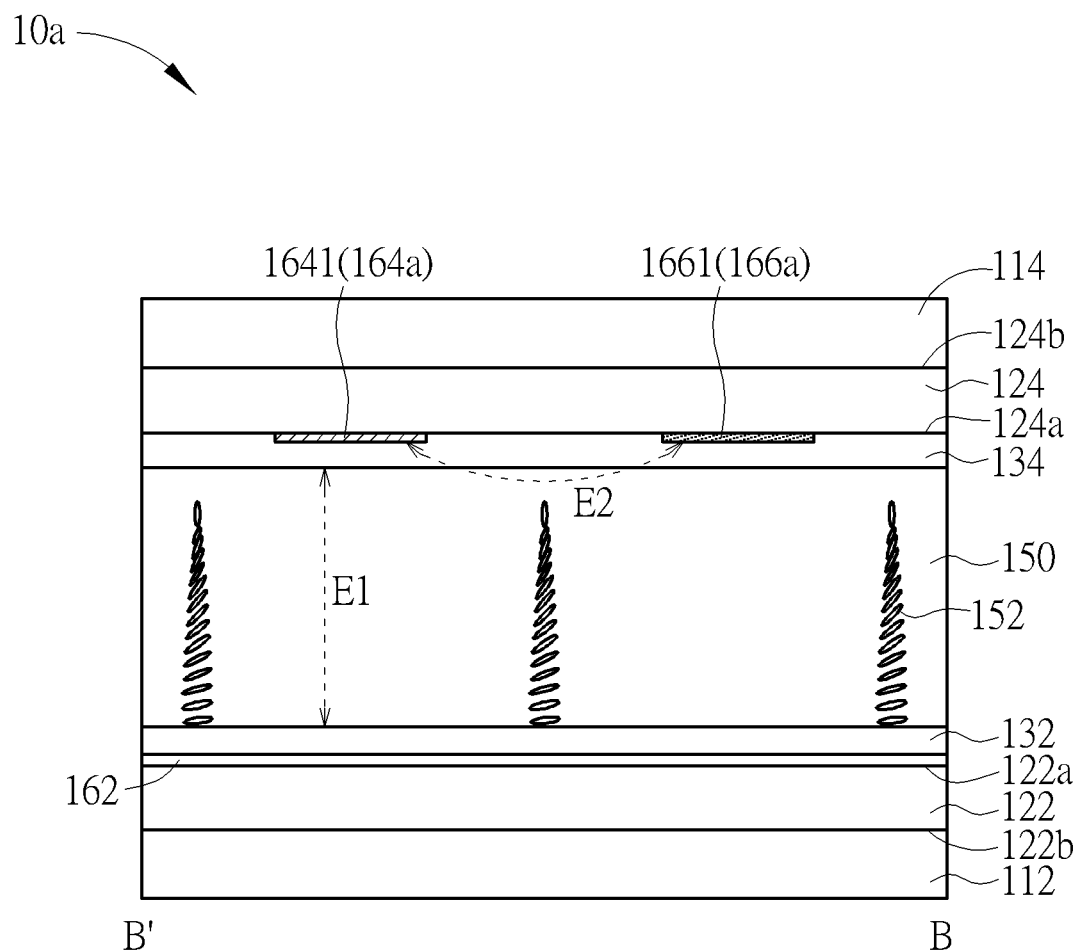
FIG. 5 is a schematic diagram showing a partial cross-sectional view of a viewing angle switchable panel according to another embodiment of the present disclosure.
Figure 6:
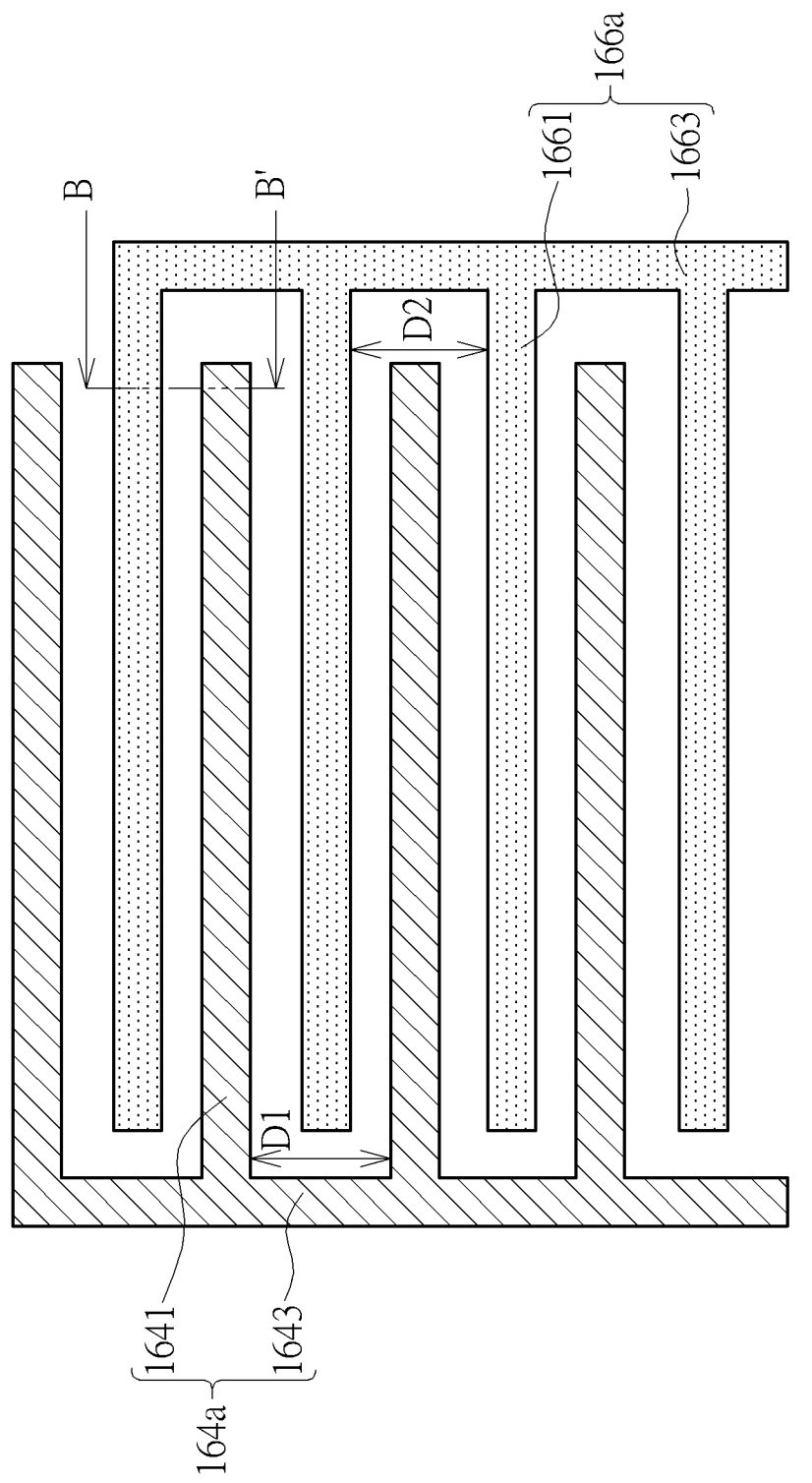
FIG. 6 is a schematic diagram showing top views of a second electrode and a third electrode according to another embodiment of the present disclosure.

Please refer to FIG. 5 and FIG. 6. FIG. 5 is a schematic diagram showing a partial cross-sectional view of a viewing angle switchable panel according to another embodiment of the present disclosure, FIG. 6 is a schematic diagram showing top views of a second electrode and a third electrode according to another embodiment of the present disclosure. The partial cross-sectional view in FIG. 5 corresponds to the section line B-B' in FIG. 6. The main difference between the viewing angle switchable panel 10a and the viewing angle switchable panel 10 is the shapes and the arrangement of the second electrode 164a and the third electrode 166a being different from the shapes and the arrangement of the second electrode 164 and the third electrode 166. The second electrode 164a may include a plurality of first strip portions 1641, and a spaced distance D1 is between two of the first strip portions 1641. The second electrode 164a may further include a first connecting portion 1643 disposed on one end of the plurality of first strip portions 1641 and connected with the plurality of first strip portions 1641. Herein, the shape of the first connecting portion 1643 is exemplary a strip, but not limited thereto. In some embodiments, the first strip portions 1641 can extend along a first direction (herein, the direction X), and the first connecting portion 1643 can extend along a second direction (herein, the direction Y). The extending direction (i.e., the second direction) of the first connecting portion 1643 can be perpendicular to the extending direction (i.e., the first direction) of the first strip portions 1641. The viewing angle switchable panel 10a may have a longitudinal direction (such as the direction X).

Referring to FIG. 6, the third electrode 166a may include a plurality of second strip portions 1661. In the top view, the first strip portions 1641 and the second strip portions 1661 can extend along a first direction (herein, the direction X). In some embodiments, the first strip portions 1641 and the second strip portions 1661 are staggered with each other along a second direction different from the first direction, for example, along a second direction (such as the direction Y) perpendicular to the first direction (such as the direction X). A spaced distance D2 is between two of the second strip portions 1661. The third electrode 166a may further include a second connecting portion 1663 disposed on one end of the plurality of second strip portions 1661 and connected with the plurality of second strip portions 1661. The shape of the second connecting portion 1663 is exemplary a strip, and an extending direction (such as the direction Y) of the second connecting portion 1663 is perpendicular to an extending direction (such as the direction X) of the second strip portions 1661, but not limited thereto. The spaced distance D1 may be the equal to the spaced distance D2, but not limited thereto. Specifically, the second electrode 164a and the third electrode 166a are of the same layer. That is, the second electrode 164a and the third electrode 166a are arranged on the same plane. The second electrode 164a and the third electrode 166a do not overlap with each other, and the second electrode 164a and the third electrode 166a are out of touch with each other, so that the second electrode 164a and the third electrode 166a are electrically insulated from each other. Therefore, compared with the viewing angle switchable panel 10, the insulating layer 140 can be omitted in the viewing angle switchable panel 10a. With the arrangement of the second electrode 164a and the third electrode 166a in FIG. 6, it is beneficial to provide an in-plane switching (IPS) mode.

Figure 7:
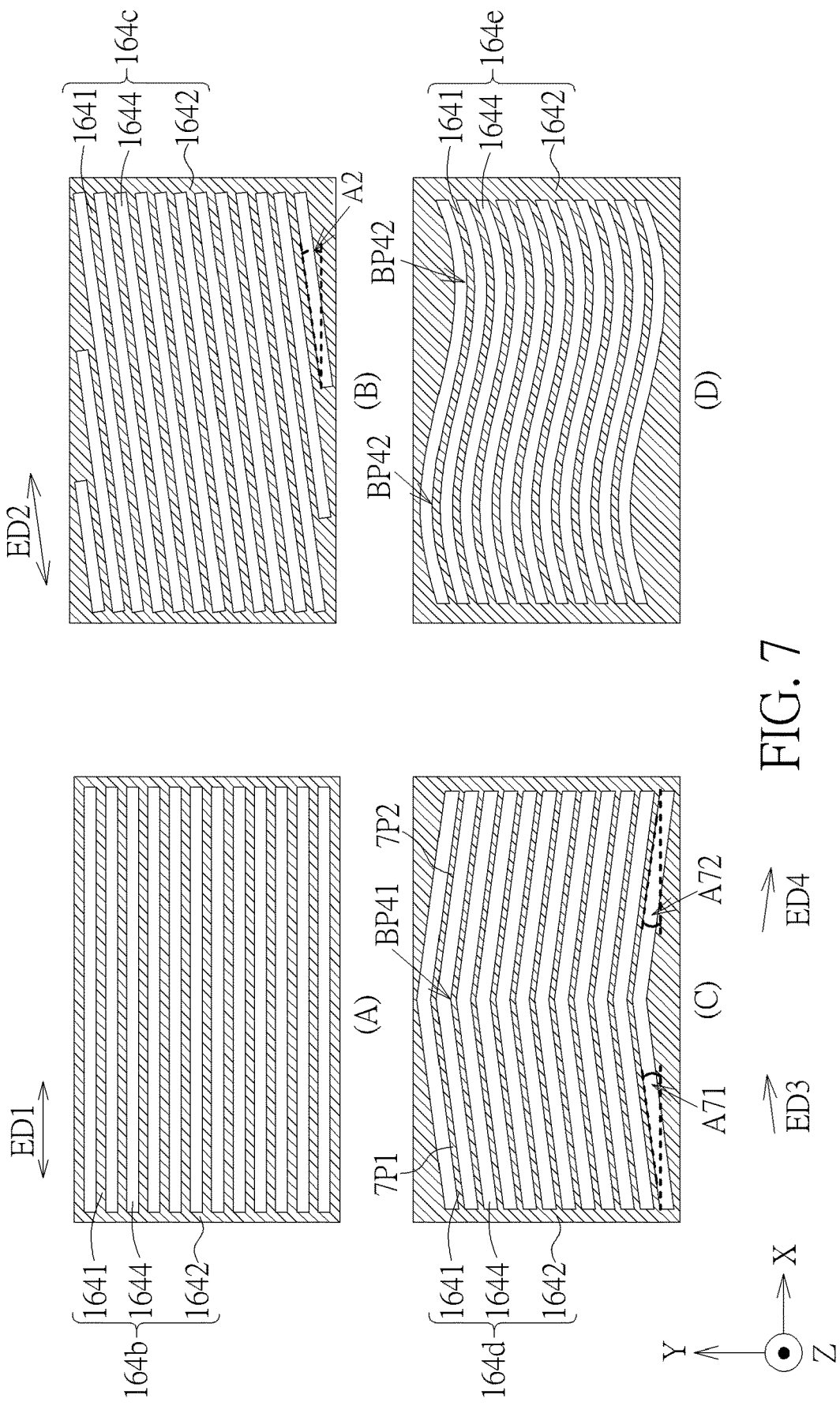
FIG. 7 is a schematic diagram showing top views of second electrodes according to yet other embodiments of the present disclosure.

Please refer to FIG. 7, which is a schematic diagram showing top views of second electrodes 164b, 164c, 164d and 164e according to yet other embodiments of the present disclosure. In the part A of FIG. 7, the second electrode 164b may include a plurality of slits 1644, a plurality of first strip portions 1641 and a first peripheral portion 1642. One of the first strip portions 1641 is located between two of the slits 1644. The first peripheral portion 1642 surrounds the plurality of slits 1644 and the plurality of first strip portions 1641. The shape of the first peripheral portion 1642 is exemplary a rectangular frame, and the first peripheral portion 1642 is connected with two ends of each of the first strip portions 1641, but not limited thereto. The viewing angle switchable panel (such as the viewing angle switchable panel 10 in FIG. 2 or the viewing angle switchable panel 10a in FIG. 5) may have a longitudinal direction (such as the direction X), at least one of the first strip portions 1641 has an extending direction ED1 parallel to the longitudinal direction, but not limited thereto. Herein, each of the first strip portions 1641 has the extending direction ED1 parallel to the longitudinal direction. In other words, the angle (not shown) between the extending direction ED1 and the longitudinal direction of the viewing angle switchable panel may be 0 degree. The main difference between the second electrode 164b and the second electrode 164 in FIG. 3 is the number and size of the first strip portion 1641. For other details of the second electrode 164b, reference may be made to the relevant description of the second electrode 164.

In the part B of FIG. 7, the viewing angle switchable panel (such as the viewing angle switchable panel 10 in FIG. 2 or the viewing angle switchable panel 10a in FIG. 5) may have a longitudinal direction (such as the direction X), at least one of the first strip portions 1641 has a portion with an extending direction ED2 oblique relative to the longitudinal direction, but not limited thereto. Herein, each of the first strip portions 1641 has a portion with the extending direction ED2. That is, the main difference between the second electrode 164c and the second electrode 164b is the extending direction ED2 of the portion of each of the first strip portions 1641 of the second electrode 164c being different from the extending direction ED1 of each of the first strip portions 1641 of the second electrode 164b. The angle A2 between the extending direction ED2 and the longitudinal direction (direction X) of the viewing angle switchable panel may be greater than 0 degree and less than or equal to 40 degrees, for example, greater than 5 degrees and less than or equal to 20 degrees, greater than 0 degree and less than or equal to 10 degrees, greater than 5 degrees and less than or equal to 15 degrees, or greater than 0 degree and less than or equal to 20 degrees.

In the part C of FIG. 7, the main difference between the second electrode 164d and the second electrode 164c is that at least one of the first strip portions 1641 of the second electrode 164d includes a bending portion BP41, so that the first strip portion 1641 of the second electrode 164d is in zigzag shape. Herein, each of the first strip portions 1641 is arranged with a bending portion BP41, and the bending portion BP41 is substantially located in the middle of the first strip portion 1641, but not limited thereto. The number and the position of the bending portion BP41 may be adjusted according to actual requirements.

In the part C of FIG. 7, in some embodiments, the first strip portions 1641 may have at least two extending directions. In details, taking one first strip portion 1641 for explanation, the first strip portion 1641 may include a first part 7P1 and a second part 7P2 connected to the first part 7P1. The bending portion BP41 is connected between the first part 7P1 and the second part 7P2. For example, the bending portion BP41 in the part C of FIG. 7 has a sharp form. The first part 7P1 can extend along a third direction ED3, and the second part 7P2 can extend along a fourth direction ED4. The third direction ED3 and the fourth direction ED4 can be different. In addition, the third direction ED3 can be different from the first direction (herein, the direction X) and different from the second direction (herein, the direction Y), and the fourth direction ED4 can be different from the first direction and different from the second direction. In some embodiments, the angle A71 between the third direction ED3 and the longitudinal direction (herein, the direction X) of the viewing angle switchable panel may be greater than 0 degree and less than or equal to 40 degrees, for example, greater than 5 degrees and less than or equal to 20 degrees, greater than 0 degree and less than or equal to 10 degrees, greater than 5 degrees and less than or equal to 15 degrees, or greater than 0 degree and less than or equal to 20 degrees. Similarly, the angle A72 between the fourth direction ED4 and the longitudinal direction (herein, direction X) of the viewing angle switchable panel may refer to the range of the angle A71 as described above, and related descriptions are omitted for clarity. The angle A71 and the angle A72 can be the same or different. In the part C of FIG. 7, two parts 7P1 and 7P2 and one bending portion BP41 are shown in one first strip portion 1641. In some embodiments, although not shown, the first strip portion 1641 can include more than two parts to form the zigzag shape, and can include more than one bending portion BP41.

In the part D of FIG. 7, the main difference between the second electrode 164e and the second electrode 164d is that the bending portion BP42 of the second electrode 164c is curve-shaped, so that the first strip portion 1641 of the second electrode 164e is in wave-like shape. Herein, each of the first strip portions 1641 is arranged with two bending portions BP42, and the curvatures of the two bending portions BP42 are opposite to each other, but not limited thereto. For example, one bending portion BP42 is curved upwardly, and the other bending portion BP42 is curved downwardly. The number and the curvature of the bending portions BP42 can be adjusted according to actual requirements. With the arrangements of the part B, the part C and the part D in FIG. 7, it is beneficial to reduce the probability of the occurrence of moiré pattern.

Figure 8:
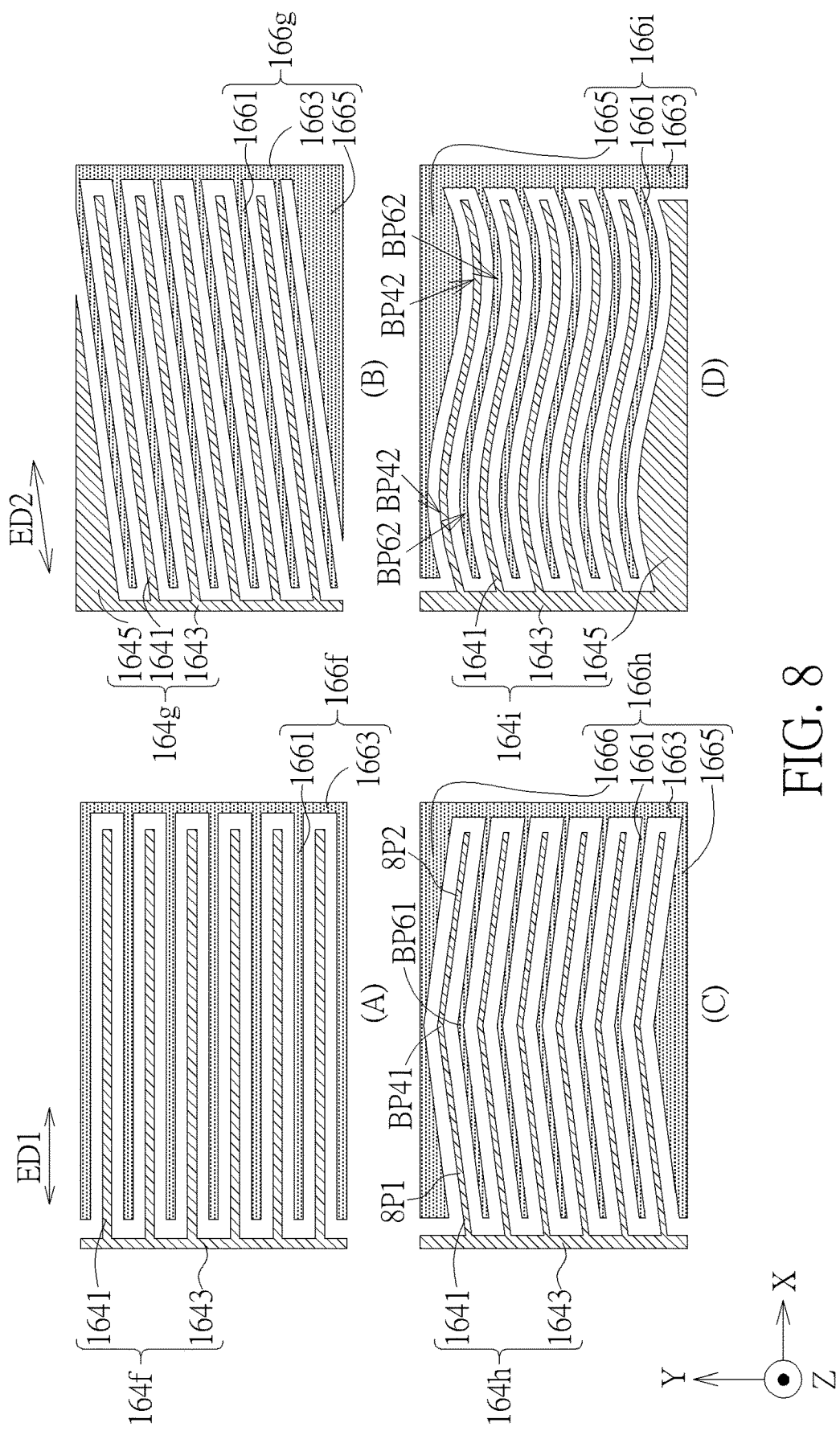
FIG. 8 is a schematic diagram showing top views of second electrodes and third electrodes according to yet other embodiments of the present disclosure.

Please refer to FIG. 8, which is a schematic diagram showing top views of second electrodes 164f, 164g, 164h and 164i and third electrodes 166f, 166g. 166h and 166i according to yet other embodiments of the present disclosure. In the part A of FIG. 8, the main difference between the second electrode 164f and the second electrode 164a in FIG. 6 is the number and size of the first strip portions 1641, and the main difference between third electrode 166f and third electrode 166a in FIG. 6 is the number and size of the second strip portions 1661. The shape of the assembly of the second electrode 164f and the third electrode 166f is substantially a rectangle, which is corresponding to a shape of the viewing angle switchable panel in the top view, but not limited thereto. For other details of the second electrode 164f and third electrode 166f, reference may be made to the related descriptions of the second electrode 164a and the third electrode 166a.

In the part B of FIG. 8, the main difference between the second electrode 164g and the second electrode 164f is that the extending direction ED2 of the first strip portion 1641 of the second electrode 164g is different from the extending direction ED1 of the first strip portion 1641 of the second electrode 164f. The main difference between the third electrode 166g and the third electrode 166f is that the extending direction ED2 of the second strip portion 1661 of third electrode 166g is different from the extending direction ED1 of the second strip portion 1661 of third electrode 166f. Moreover, the second electrode 164g may further include a first peripheral strip portion 1645 located at a side thereof (herein, the upper side of the second electrode 164g), and the shape of the first peripheral strip portion 1645 is different from the shape of the first strip portion 1641. The third electrode 166g may further include a second peripheral strip portion 1665 located at a side thereof (herein, the lower side of the third electrode 166g), and the shape of the second peripheral strip portion 1665 is different from the shape of the second strip portion 1661. The shape of the assembly of the second electrode 164g and the third electrode 166g is substantially a rectangle, which is corresponding to a shape of the viewing angle switchable panel in the top view, but not limited thereto. For details of the extending direction ED1 and the extending direction ED2, reference may be made to the related descriptions of FIG. 7, and is omitted herein. In part B of FIG. 8, the angle between the extending direction ED2 and the longitudinal direction (herein, the direction X) of the viewing angle switchable panel can refer to the description of the angle A2 in part B of FIG. 7, and related descriptions are omitted for clarity.

In the part C of FIG. 8, the main difference between the second electrode 164h and the second electrode 164g is that the first strip portion 1641 of the second electrode 164h includes a bending portion BP41, so that the first strip portion 1641 of the second electrode 164h is in zigzag shape. Moreover, the second electrode 164h does not include a first peripheral strip portion located at a side thereof. The main difference between the third electrode 166h and the third electrode 166g is that the second strip portion 1661 of the third electrode 166h includes a bending portion BP61, so that the second strip portion 1661 of the third electrode 166h is in zigzag shape. Moreover, the third electrode 166h may further include a second peripheral strip portion 1665 located at a side thereof (herein, the lower side of the third electrode 166h) and a third peripheral strip portion 1666 located at another side thereof (herein, the upper side of the third electrode 166h). The shape of the second peripheral strip portion 1665 and the shape of the third peripheral strip portion 1666 are different from the shape of the second strip portion 1661, and the shape of the second peripheral strip portion 1665 and the shape of the third peripheral strip portion 1666 are different from each other. The shape of the assembly of the second electrode 164h and the third electrode 166h is substantially a rectangle, which is corresponding to a shape of the viewing angle switchable panel in the top view, but not limited thereto.

In the part C of FIG. 8, the first strip portions 1641 are similar to the first strip portions 1641 in part C of FIG. 7. In details, taking one first strip portion 1641 for explanation, the first strip portion 1641 may include a first part 8P1 and a second part 8P2 connected to the first part 8P1. The bending portion BP41 is connected between the first part 8P1 and the second part 8P2. For example, the bending portion BP41 in the part C of FIG. 8 has a sharp form. The angle between the extending direction of the first part 8P1 and the longitudinal direction (herein, the direction X) of the viewing angle switchable panel and the angle between the extending direction of the second part 8P2 and the longitudinal direction (herein, the direction X) of the viewing angle switchable panel can refer to the description of the angles A71 and A72 in the part C of FIG. 7, and related descriptions are omitted for clarity.

In the part D of FIG. 8, the main difference between the second electrode 164i and the second electrode 164h is that the bending portion BP42 of the second electrode 164i is curve-shaped, so that the first strip portion 1641 of the second electrode 164i is in wave-like shape. Moreover, the second electrode 164i may further include a first peripheral strip portion 1645 located at a side thereof (herein, the lower side of the second electrode 164i), and the shape of the first peripheral strip portion 1645 is different from the shape of the first strip portion 1641. The main difference between the third electrode 166i and the third electrode 166h is that the bending portion BP62 of the third electrode 166*i* being curve-shaped, and the second strip portion 1661 of the third electrode 166*i* is in wave-like shape. Moreover, the third electrode 166*i* only include a second peripheral strip portion 1665 located at a side thereof (herein, the upper side of the third electrode 166*i*) and does not include a third peripheral strip portion located at another side thereof. The shape of the second peripheral strip portion 1665 is different from the shape of the second strip portion 1661. The shape of the assembly of the second electrode 164*i* and the third electrode 166*i* is substantially a rectangle, which is corresponding to a shape of the viewing angle switchable panel in the top view, but not limited thereto. With the arrangements of the part B, the part C and the part D in FIG. 8, it is beneficial to reduce the probability of the occurrence of moiré pattern. Structures of the first strip portion 1641 and the second strip portion 1661 can refer to the description of the first strip portion 1641 the part D of in FIG. 7, and related descriptions are omitted for clarity.

Figure 9:
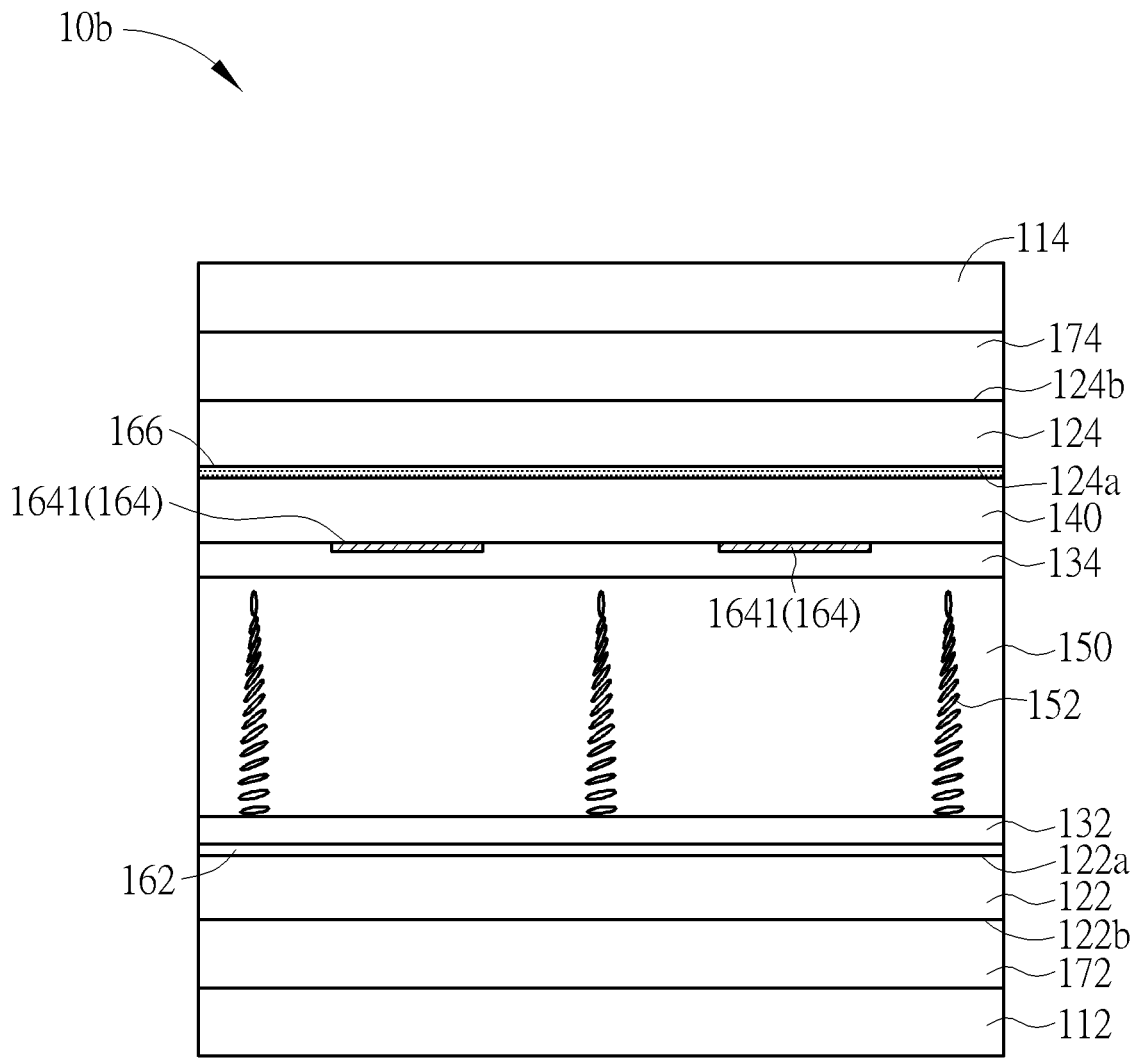
FIG. 9 is a schematic diagram showing a partial cross-sectional view of a viewing angle switchable panel according to yet another embodiment of the present disclosure.

FIG. 9 is a schematic diagram showing a partial cross-sectional view of a viewing angle switchable panel according to yet another embodiment of the present disclosure. The main difference between the viewing angle switchable panel 10*b* and the viewing angle switchable panel 10 is the viewing angle switchable panel 10*b* further includes a first compensation film 172 and a second compensation film 174. The first compensation film 172 is disposed on the outer surface 122*b* of first substrate 122, and the second compensation film 174 is disposed on the outer surface 124*b* of the second substrate 124, but not limited thereto. In other embodiments, the viewing angle switchable panel 10*b* may only include one of the first compensation film 172 and the second compensation film 174, but not limited thereto. The first compensation film 172 and the second compensation film 174 may be independently an A-plate, a C-plate, a biaxial film, an O-film, a discotic liquid crystal film, other suitable films or a combination thereof. Thereby, the performance of the viewing angle switchable panel 10*b* can be adjusted according to actual requirements. The A plate, the C plate, the biaxial film, the O film, and the discotic liquid crystal film are well known in the art and details thereof are omitted herein.

Figure 10A:
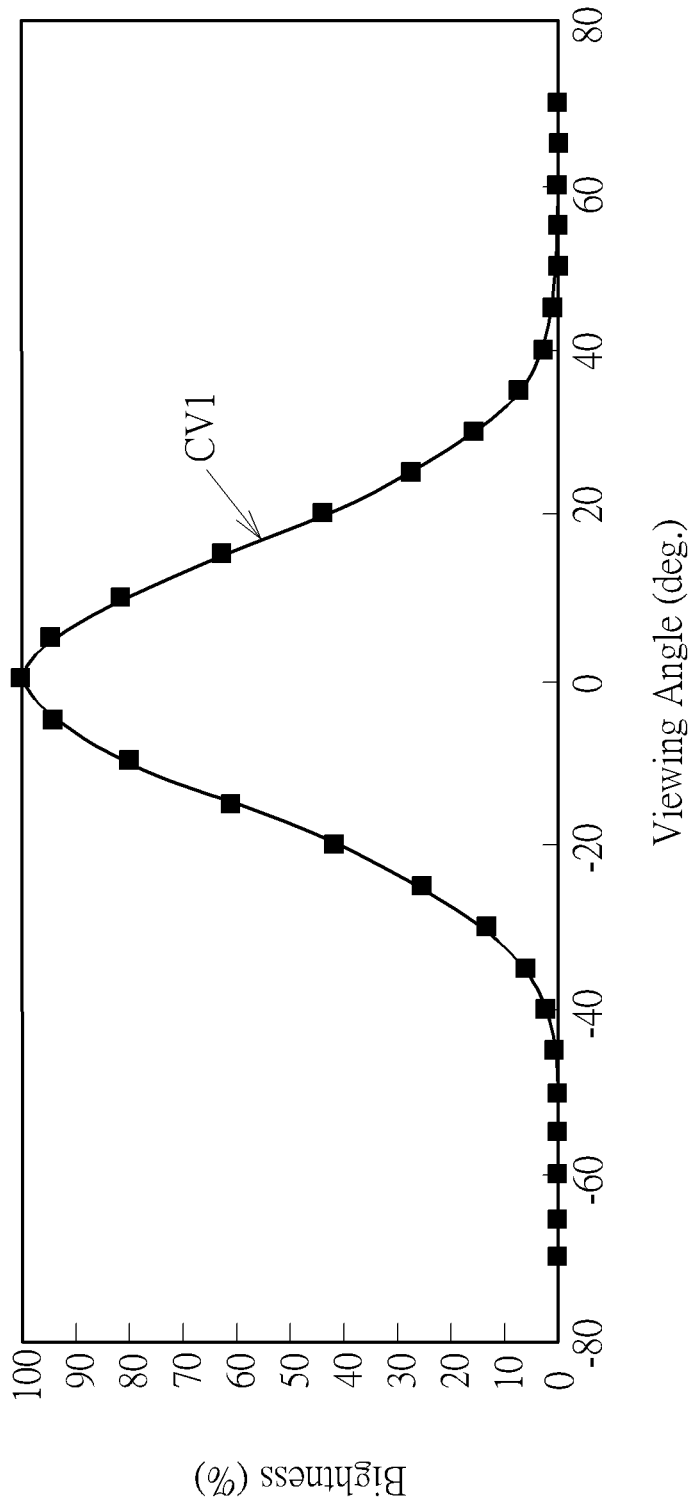
FIG. 10A shows an experimental result of a privacy performance of an electronic device according to an embodiment of the present disclosure.

Please refer to FIG. 10A, which shows an experimental result of the privacy performance of the electronic device according to an embodiment of the present disclosure. Specifically, the graph CV1 shows the relationship between the brightness and viewing angle when the electronic device is in the privacy mode. Table 2 shows the data corresponding to FIG. 10A. The basis is that the brightness is 100% when the viewing angle is 0 degree. FIG. 10A and Table 2 show that in the wide viewing angle, for example, greater than or equal to 45 degrees, or less than or equal to −45 degrees, the brightness is lower than 10%, lower than 5%, lower than 1%, or even less than 0.5%. It shows that the viewer can see a dark image in an oblique position, and the electronic device according to the present disclosure can provide good privacy performance.

Figure 10B:
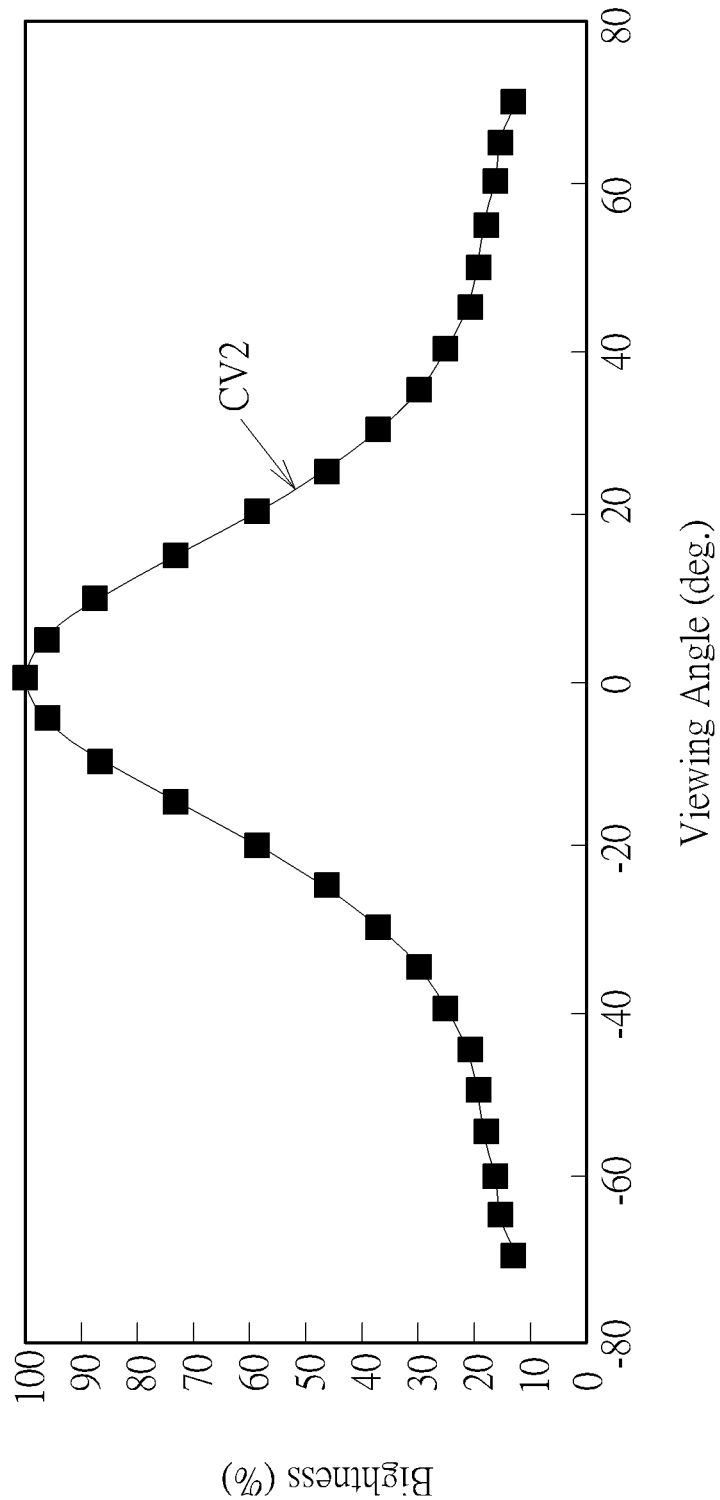
FIG. 10B shows an experimental result of a sharing performance of an electronic device according to an embodiment of the present disclosure.

Please refer to FIG. 10B, which shows an experimental result of the sharing performance of the electronic device according to an embodiment of the present disclosure. Specifically, the graph CV2 shows the relationship between the brightness and viewing angle when the electronic device is in the sharing mode. Table 3 shows the data corresponding to FIG. 10B. The basis is that the brightness is 100% when the viewing angle is 0 degree. FIG. 10B and Table 3 show that in the wide viewing angle, for example, greater than or equal to 45 degrees, or less than or equal to −45 degrees, the brightness is greater than 10%, greater than 15%, or even greater than 20%. It shows that the viewer can still see a clear image in an oblique position, and the electronic device according to the present disclosure can provide good sharing performance.

TABLE 2

(in privacy mode)

| viewing angle | brightness (%) |
| --- | --- |
| −70 | 0.46 |
| −65 | 0.38 |
| −60 | 0.33 |
| −55 | 0.31 |
| −50 | 0.40 |
| −45 | 0.89 |
| −40 | 2.46 |
| −35 | 6.26 |
| −30 | 13.58 |
| −25 | 25.55 |
| −20 | 42.08 |
| −15 | 61.56 |
| −10 | 80.49 |
| −5 | 94.57 |
| 0 | 100.00 |
| 5 | 95.14 |
| 10 | 81.88 |
| 15 | 63.51 |
| 20 | 44.50 |
| 25 | 27.99 |
| 30 | 15.78 |
| 35 | 7.85 |
| 40 | 3.44 |
| 45 | 1.34 |
| 50 | 0.55 |
| 55 | 0.34 |
| 60 | 0.33 |
| 65 | 0.35 |
| 70 | 0.37 |

TABLE 3

(in sharing mode)

| viewing angle | brightness (%) |
| --- | --- |
| −70 | 13.86 |
| −65 | 16.09 |
| −60 | 17.40 |
| −55 | 18.56 |
| −50 | 20.02 |
| −45 | 22.25 |
| −40 | 25.57 |
| −35 | 30.42 |
| −30 | 37.28 |
| −25 | 46.63 |
| −20 | 58.66 |
| −15 | 72.40 |
| −10 | 85.76 |
| −5 | 95.85 |
| 0 | 100.00 |
| 5 | 96.59 |
| 10 | 87.11 |
| 15 | 73.87 |
| 20 | 60.06 |
| 25 | 47.68 |
| 30 | 38.01 |
| 35 | 30.86 |
| 40 | 25.87 |
| 45 | 22.47 |

TABLE 3-continued (in sharing mode)

| viewing angle | brightness (%) |
|---|---|
| 50 | 20.20 |
| 55 | 18.62 |
| 60 | 17.42 |
| 65 | 16.13 |
| 70 | 14.07 |

In the electronic device according to the present disclosure, by modifying the electric potential of the first electrode on the inner surface of the first substrate and the electric potentials of the second electrode and third electrode on the inner surface of the second substrate, the viewing angle switchable panel can be switched between a narrow viewing angle mode and a wide viewing angle mode, so that the electronic device can provide the narrow viewing angle mode and the wide viewing angle mode. In addition, the viewing angle switchable panel may be cooperated with different types of display panel, which has the advantage of wide versatility.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An electronic device, comprising:
a display panel; and
a viewing angle switchable panel overlapping with the display panel, the viewing angle switchable panel comprising:
a first substrate;
a second substrate disposed opposite to the first substrate, wherein the second substrate comprises a viewing surface for a viewer;
a first electrode disposed on an inner surface of the first substrate;
an electrode layer disposed on an inner surface of the second substrate, the electrode layer comprising a second electrode and a third electrode electrically insulated from the second electrode; and
a switching medium layer disposed between the first substrate and the second substrate;
wherein in a top view, the second electrode comprises a plurality of first strip portions and a first connecting portion, the plurality of first strip portions extend along a first direction, the first connecting portion extends along a second direction perpendicular to the first direction, and the first connecting portion is connected to the plurality of first strip portions;
wherein in the top view, the third electrode comprises a plurality of second strip portions and a second connecting portion, the plurality of second strip portions extend along the first direction, the second connecting portion extends along the second direction, and the second connecting portion is connected to the plurality of second strip portions; and
wherein in the top view, the plurality of first strip portions and the plurality of second strip portions are staggered along the second direction;
wherein a horizontal electric field is provided between the second electrode and the third electrode and a vertical electric field is provided between the first electrode and the second electrode simultaneously, and the viewing angle switchable panel is in a wide viewing angle mode when the horizontal electric field is greater than the vertical electric field.

2. The electronic device of claim 1, wherein the switching medium layer comprises a liquid crystal layer.

3. The electronic device of claim 1, wherein the viewing angle switchable panel further comprises:
a horizontal alignment layer disposed on the inner surface of the first substrate; and
a vertical alignment layer disposed on the inner surface of the second substrate.

4. The electronic device of claim 1, wherein a retardation of the viewing angle switchable panel is 1000 nm to 25000 nm.

5. The electronic device of claim 1, wherein the viewing angle switchable panel has a longitudinal direction, and at least one of the first strip portions has an extending direction parallel to the longitudinal direction.

6. The electronic device of claim 1, wherein when an electric potential difference between the first electrode and the second electrode is greater than an electric potential difference between the second electrode and the third electrode, the vertical electric field is greater than the horizontal electric field.

7. The electronic device of claim 1, wherein when an electric potential difference between the first electrode and the second electrode is smaller than an electric potential difference between the second electrode and the third electrode, the horizontal electric field is greater than the vertical electric field.

8. The electronic device of claim 1, wherein in the top view, the plurality of first strip portions of the second electrode comprises two adjacent first strip portions, a slit is disposed between the two adjacent first strip portions of the second electrode, and one of the plurality of second strip portions of the third electrode is disposed in the slit.

9. The electronic device of claim 1, wherein the viewing angle switchable panel is capable of being controlled by the first electrode, the second electrode and the third electrode to be switched in a first mode or in a second mode, the first mode is a narrow viewing angle mode, and the second mode is the wide viewing angle mode.

10. The electronic device of claim 1, wherein the viewing angle switchable panel is in a narrow viewing angle mode when the vertical electric field is greater than the horizontal electric field.

11. An electronic device, comprising:
a display panel; and
a viewing angle switchable panel overlapping with the display panel, the viewing angle switchable panel comprising:
a first substrate;
a second substrate disposed opposite to the first substrate;
a first electrode disposed on an inner surface of the first substrate;
a second electrode disposed on an inner surface of the second substrate, wherein in a top view, the second electrode of the viewing angle switchable panel comprises a plurality of first strip portions electrically connected with each other, the second electrode further comprises a peripheral portion surrounding and connecting two ends of each of the plurality of first strip portions, and the peripheral portion is disposed outside an active area of the display panel and does not overlap with the active area of the display panel in the top view;

a third electrode disposed on the inner surface of the second substrate and electrically insulated from the second electrode; and a switching medium layer disposed between the first substrate and the second substrate.

12. The electronic device of claim 11, wherein the switching medium layer comprises a liquid crystal layer.

13. The electronic device of claim 11, wherein the viewing angle switchable panel further comprises:

a horizontal alignment layer disposed on the inner surface of the first substrate; and a vertical alignment layer disposed on the inner surface of the second substrate.

14. The electronic device of claim 11, wherein the viewing angle switchable panel is capable of being controlled by the first electrode, the second electrode and the third electrode to be switched in a first mode or in a second mode, and the first mode is a narrow viewing angle mode, and the second mode is a wide viewing angle mode.

15. The electronic device of claim 11, wherein when a horizontal electric field is provided between the second electrode and the third electrode, the viewing angle switchable panel is in a wide viewing angle mode.

16. The electronic device of claim 11, wherein when a vertical electric field is provided between the first electrode and the second electrode, the viewing angle switchable panel is in a narrow viewing angle mode.

17. The electronic device of claim 11, wherein when an electric potential difference between the first electrode and the second electrode or an electric potential difference between the first electrode and the third electrode is greater than an electric potential difference between the second electrode and the third electrode, a vertical electric field is provided between the first electrode and the second electrode.

18. The electronic device of claim 11, wherein when an electric potential difference between the first electrode and the second electrode and an electric potential difference between the first electrode and the third electrode are smaller than an electric potential difference between the second electrode and the third electrode, a horizontal electric field is provided between the second electrode and the third electrode.

19. The electronic device of claim 11, wherein in the top view, the third electrode is in plate shape and overlaps with the second electrode.

* * * * *